United States Patent [19]

Tuan et al.

[11] Patent Number: 4,719,481

[45] Date of Patent: Jan. 12, 1988

[54] ELECTROGRAPHIC ION WRITING HEAD DRIVER SYSTEM

[75] Inventors: Hsing C. Tuan; Malcolm J. Thompson, both of Palo Alto, Calif.

[73] Assignee: Xerox Corporation, Stamford, Conn.

[21] Appl. No.: 861,472

[22] Filed: May 9, 1986

Related U.S. Application Data

[63] Continuation-in-part of Ser. No. 678,146, Dec. 4, 1984, Pat. No. 4,588,997.

[51] Int. Cl.[4] ...................... G01D 15/06; G01D 15/18

[52] U.S. Cl. ................................ 346/159; 346/76 PH; 346/155; 346/75

[58] Field of Search .................. 346/76 PH, 159, 155, 346/75

[56] References Cited

U.S. PATENT DOCUMENTS

| | | | |
|---|---|---|---|
| 4,112,437 | 9/1978 | Mir et al. | 346/159 |
| 4,516,136 | 5/1985 | Willcox | 346/76 PH |
| 4,584,592 | 4/1986 | Tuan et al. | 346/159 |

*Primary Examiner*—Clifford C. Shaw
*Assistant Examiner*—Gerald E. Preston
*Attorney, Agent, or Firm*—Serge Abend

[57] ABSTRACT

A thin film writing head for recording information upon a record medium by means of a continuous writing process. The writing head comprises thin film elements including marking elements, high and low voltage bus lines, driver circuitry, and switching elements, integrally fabricated upon a large area substrate. A latching circuit, including at least one of the switching elements is located between the pair of bus lines for connecting the marking elements directly to one of the bus lines, so as to insure that the marking elements are always connected to a source of reference potential.

2 Claims, 4 Drawing Figures

ELECTROGRAPHIC ION WRITING HEAD DRIVER SYSTEM

This is a continuation-in-part of application Ser. No. 678,146, filed Dec. 4, 1984, now U.S. Pat. No. 4,588,997.

FIELD OF THE INVENTION

This invention relates to a thin film writing head for recording information upon a record medium by means of a continuous writing process. The writing head comprises thin film elements including marking elements, high and low voltage bus lines, driver circuitry, and switching elements, integrally fabricated upon a large area substrate. A latching circuit, including at least one of the switching elements is located between the pair of bus lines for electrically connecting the marking elements to one of the bus lines, so as to insure that the marking elements are always connected to a source of reference potential. This unique arrangement has utility in electrographic writing systems and in ion projection writing systems.

BACKGROUND OF THE INVENTION

Electrographic writing systems are well known. They comprise a writing head usually having a linear array of marking elements in the form of styluses or nibs for generating sequential raster lines of information by means of high voltage electrical discharges across a minute air gap to a conductive electrode. An insulating record medium, interposed between the styluses and the conductive electrode, retains thereon invisible electrostatically charged areas formed on its surface in response to the electrical discharges. Subsequently, the charged areas are rendered visible by the application of "ink", which may be in liquid or powder form, held to the medium by electrostatic attraction. the visible image may be fixed to the medium in any one of a variety of ways, to produce a permanent record. An example of such a writing system is disclosed in our parent patent application U.S. Ser. No. 678,146 filed Dec. 4, 1984, now U.S. Pat. No. 4,588,997 and entitled "Improved Electrographic Writing Head", fully incorporated herein by reference.

A fluid jet assisted ion projection printer, of the type utilized herein, is disclosed in commonly assigned U.S. Pat. No. 4,463,363 issued on July 31, 1984 in the names of Robert W. Gundlach and Richard L. Bergen, entitled "Fluid Jet Assisted Ion Projection Printing". In that printing system, an imaging charge is placed upon a moving receptor sheet, such as paper, by means of a linear array of closely spaced minute air "nozzles". The charge, comprising ions of a single polarity (preferably positive), is generated in an ionization chamber by a high voltage corona discharge and is then transported to and through the "nozzles" where it is electrically controlled, within each "nozzle" structure, by an electrical potential applied to an array of marking elements in the form of modulating electrodes. Selective control of the electrical potential applied to each of the modulating electrodes in the array will enable areas of charge and areas of absence of charge to be deposited on the receptor sheet for being subsequently made visible by suitable development apparatus.

A typical modulation structure for the ion projection type of printer is disclosed in U.S. Pat. No. 4,524,371 issued on June 18, 1985 in the names of Nicholas K. Sheridon and Michael A. Berkovitz and entitled "Modulation Structure For Fluid Jet Assisted Ion Projection Printing Apparatus". In that device, a planar marking head is mounted on the ion generating housing and each electrode thereon is addressed individually, for modulating each "nozzle" independently.

A high quality marking head of page width, i.e. about 8.5 inches wide, having a resolution of 200 to 400 spots per inch (spi), would result in an array of 1700 to 3400 marking elements. In order to simplify, and thereby reduce the cost of such a marking head, it would desirably include, on a single large-area substrate, a thin film marking element array, address lines, data lines, high and low potential bus lines, an inverter-type thin film switching circuit and a thin film latching circuit.

The primary object of the present invention is to provide an improved marking head, manufacturable by thin film fabrication techniques, including an electrical circuit in which marking elements are at all times electrically connected to either a source of high potential or a source of low potential.

It is a further object to provide a marking head wherein each of the marking elements will be controlled by a latching circuit and an inverter circuit for allowing each element to be connected to a source of marking potential through the inverter circuit, for substantially a line time, until the latching circuit is unlatched.

SUMMARY OF THE INVENTION

The present invention may be carried out, in one form, by providing a marking head for placing developable charges upon a charge receptor surface in an image-wise pattern. The marking head, in an ion projection writing system, includes a substrate upon which are formed a plurality of closely spaced marking elements, each element being switchable between one of two states, a charge storage state and a non-marking state. A pair of bus lines, one connected to a high voltage source and the other connected to a low voltage source, each connectable to said marking elements through an inverter circuit for achieving the charge storage state or the non-marking state. A latching circuit connected to the inverter circuit changes the state of the inverter circuit for connecting either the high voltage source or the low voltage source to the charge storage elements. Information loading means, in the form of a multiplexed addressing circuit selectively changes the state of the latching circuit. All of the elements, circuits and devices carried by the substrate are integrally formed thereon as thin film elements.

BRIEF DESCRIPTION OF DRAWINGS

Other objects and further features and advantages of this invention will be apparent from the following, more particular, description considered together with the accompanying drawings, wherein.

DETAILED DESCRIPTION OF THE ILLUSTRATED EMBODIMENTS

Figure 1:
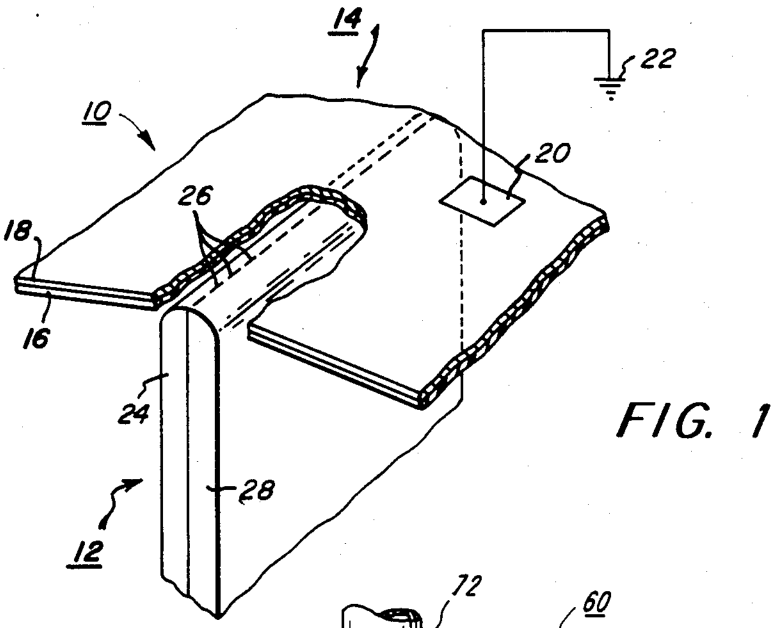
FIG. 1 is a perspective view of the charging station of an electrographic marking system.
Figure 3:
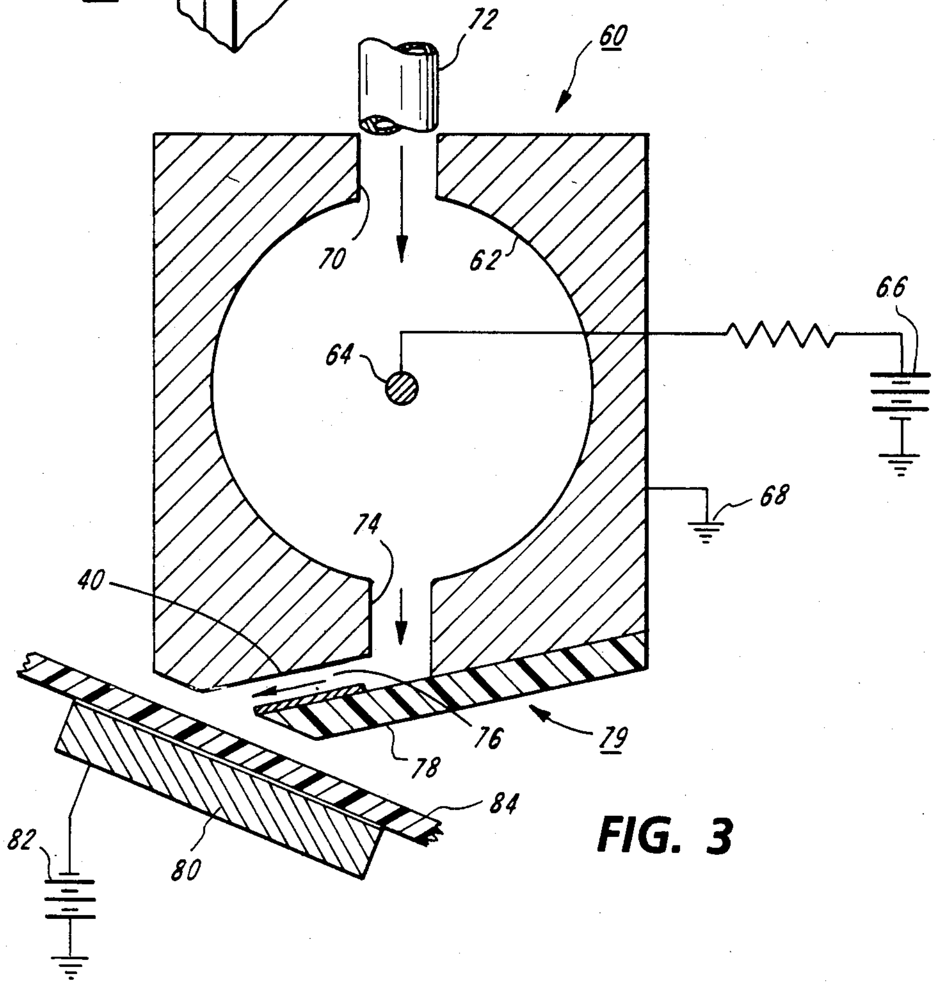
FIG. 3 is a partial cross-sectional elevation view showing an ion projection marking head.

With particular reference to the drawings, there is illustrated in FIG. 1 the relevant elements of an electrographic writing system 10. A writing head 12 is provided for depositing an electrostatic image on the surface of record medium 14. The record medium comprises a dielectric layer 16 and a conductive layer 18. This configuration is but one form of the record medium, which may take other conventional forms as long as a dielectric layer is adjacent the writing head, for retaining a charge, and a conductive layer is contiguous with the dielectric layer, for completing an electrical path, through shoe 20, to a source of reference potential 22. The writing head comprises a sandwich including a substrate 24 upon which an array of marking elements, in the form of thin film conductive stylus electrodes 26, and a protective insulating overcoating 28 have been fabricated. At the edge of the head, in contact with the record medium, the ends of the conductive styluses are exposed and are maintained slightly spaced from the surface of the medium by an air gap through which selective ionizing electrical discharges take place.

We have made writing head 12 (schematically shown in FIG. 2) extremely inexpensive to manufacture, since all its elements are integrally fabricated upon substrate 24 by standard thin film deposition techniques. Each stylus 26 has associated therewith, also carried upon the substrate, a high voltage thin film transistor 28, a thin film load resistor 30, and a low voltage thin film transistor 32. Writing data is loaded via a multiplexed driver circuit incorporating address bus lines (A) 34 and data bus lines (D) 36. In a related patent application, U.S. Ser. No. 588,485 filed Mar. 12, 1984 in the name of Hsing C. Tuan, entitled "Improved High Voltage Thin Film Transistor", the structure of the novel high voltage thin film transistor used herein is disclosed.

We have found that amorphous semiconductor materials, such as amorphous silicon (a-Si:H) are uniquely suited to the desired operational and fabrication characteristics of the high voltage as well as the low voltage transistors. In view of the relatively inexpensive fabrication costs of both active and passive thin film devices over large area formats (for example, upon glass, polyimide or other suitable substrates), it is possible to provide a low cost writing head in which each of the styluses in the array is individually switchable. Furthermore, we have devised a circuit which incorporates high voltage thin film transistors (of the type identified in the preceding paragraph) and latching means, one associated with each stylus, for applying writing signals to the associated stylus electrode marking element and for continuously connecting one of two potential sources to the stylus for holding the proper potential thereon until it is switched.

The latching means for the high voltage thin film transistor 28 is the low voltage thin film transistor 32. Gate electrode 38 of the high voltage thin film transistor 28 is connected to the drain electrode 40 of the low voltage thin film transistor 32 whose gate electrode 42 in turn is connected to address bus line 34, and whose source electrode 44 is connected to data bus line 36. Thus, signal information, imposed upon the data lines, may selectively latch the high voltage transistors.

The number of address bus lines and data bus lines is reduced to a minimum through a multiplexing scheme which results in minimizing the required number of wire bonds to the external world. Wire bonds are only necessary between external IC address bus drivers 46 and the address bus lines 34, and between the external IC data bus drivers 48 and the data bus lines 36.

The multiplexing arrangement for the writing head array of n styluses, each stulus having associated therewith a pair of high and low voltage switches, comprises: p sections, or groups, of styluses, each section having q styluses (where $n=p\times q$); p address bus lines ($A_1$ through $A_p$), each for addressing a selected section; and q data bus lines ($D_1$ through $D_q$) each capable of imposing signal information on like numbered stylus electrodes (E).

The high voltage transistors 28 are part of an inverter circuit, wherein the source electrodes 50 of each are connected to a reference potential 54, such as ground, through a ground bus (G) 56 and the drain electrodes 52 are connected via suitable load resistors 30 to a high voltage bus (HV) 58. Styluses 26 are connected to the drain electrode of the high voltage transistor 28. Data potential of 0 volts (OFF) or 10 to 40 volts (ON) will be transferred from the data bus lines 36 through the low voltage transistors 32 to the gate electrodes 38 of the high voltage transistors 28. The charge is capacitively stored across the gate electrode 38 and source electrode 50 and, due to the very low leakage current of the low voltage transistor in the OFF state, will remain substantially unchanged until readdressed by the low voltage transistor.

In the ON state of the high voltage transistor 28, no marking will take place since a current path exists from the high voltage power supply to ground. There will be a large voltage drop across the load resistor 30, and the potential at the drain electrode of the high voltage transistor, and on the stylus electrode, will be less than that required for writing. For example, with a high voltage of about 600 volts applied to high voltage bus 58, and a load resistor 30 of about 100 megohms, the voltage on the stylus electrode would be about 50 volts when the high voltage transistor is in its ON state.

Conversely, with the high voltage transistor is in the OFF state, writing will take place. No current path exists from the high voltage power supply to ground. Therefore, there will be no substantial potential drop across the load resistor 30 and the high voltage potential on the order of 500 to 600 volts will be applied to the stylus electrode 26, allowing it to write.

In related U.S. Pat. No. 4,584,592 issued Apr. 22, 1986 in our names, entitled "Marking Head For Fluid Jet Assisted Ion Projection Imaging System", we have disclosed a writing head incorporating a similar multiplexed drive circuit for use with an ion projection writing system.

The ion projection marking apparatus will now be described. As is shown, housing 60 includes an ion generation region including an electrically conductive chamber 62, a corona wire 64, extending substantially coaxially in the chamber, a high potential source 66, on the order of several thousand volts DC, applied to the wire 64, and a reference potential source 68, such as ground, connected to the wall of chamber 62. A corona discharge around the wire creates a source of ions, of a given polarity (preferably positive), which are attracted to the grounded chamber wall and fill the chamber with a space charge.

An axially extending inlet channel 70 delivers pressurized transport fluid (preferably air) into the chamber 62 from a suitable source, schematically illustrated by the tube 72. Transport fluid is conducted from the corona chamber 62 to the exterior of the housing 60 through an axially extending outlet channel 74 and then through an ion modulation region 76. As the transport fluid passes through and exits the chamber 62, through outlet channel 74, it entrains a number of ions and moves them past ion modulation electrodes 78, on the writing head 79, in the ion modulation region 76.

Ions allowed to pass completely through and out of the housing 60, through the outlet channel 74, come under the influence of accelerating back electrode 80 which is connected to a high potential source 82, on the order of several thousand volts DC, of a sign opposite to that of the corona source 66. A charge receptor 84 moves over the back electrode and collects the ions upon its surface. Subsequently the latent image charge pattern may be made visible by suitable development apparatus (not shown). Alternatively, a transfer system may be employed, wherein the charge pattern is applied to an insulating intermediate surface such as a dielectric drum. In such a case, the latent image charge pattern may be made visible by development upon the drum surface and then transferred to an image receptor sheet.

Once the ions have been swept into the outlet channel 74 by the transport fluid, it becomes necessary to render the ion-laden fluid stream intelligible. This is accomplished in the modulation region by the individually switchable modulation electrodes 78 and a suitable modulation circuit, formed on the marking head 79 and represented schematically in FIG. 4.

Figure 4:
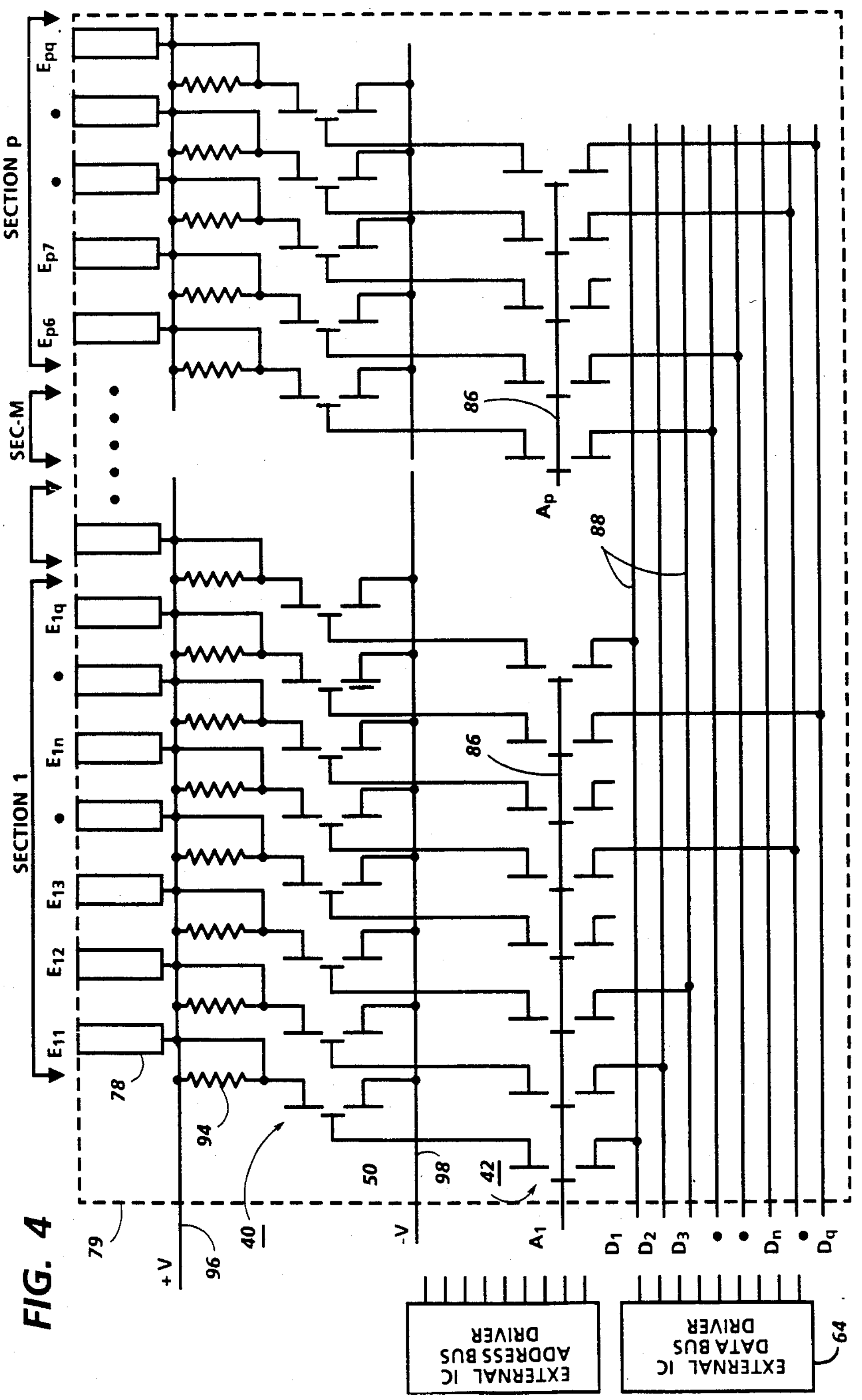
FIG. 4 is a schematic representation of an integral thin film ion projection marking head showing the marking elements, the thin film switching elements and the driver circuitry.

A planar, non-conducting substrate, indicated by dotted lines in FIG. 4, supports a multiplexed data entry or information loading circuit, comprising a relatively small number of address bus lines (A) 86 and data bus lines (D) 88 and an array of closely spaced marking elements in the form of parallel modulation electrodes (E) 78. Also mounted upon the substrate and associated with each modulation electrode is a latching circuit including a low voltage thin film transistors 90 and an inverter circuit including a second low voltage thin film transistor 92, and load resistor 94. The illustrated inverter circuit comprises a voltage divider between two reference potential buses 96 (V+) and 98 (V−), wherein the load resistor 94 is in one leg of the divider and the low voltage transistor 92 is in the other leg, with the modulation electrode connected to the node between them.

Figure 2:
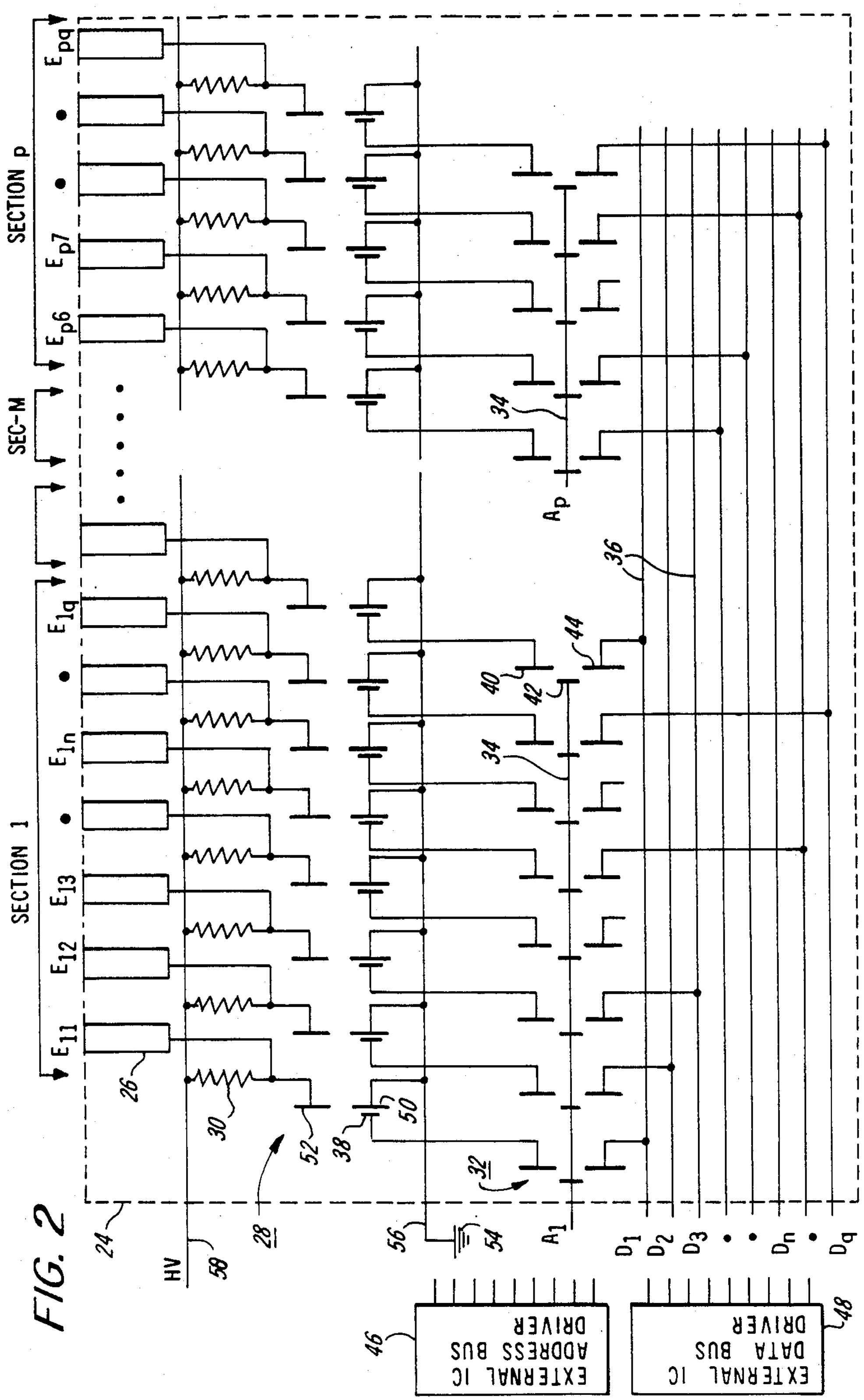
FIG. 2 is a schematic representation of an integral thin film electrographic marking head showing the marking elements, the thin film switching elements and the driver circuitry.

It can be seen that the ion projection writing head circuit of FIG. 4 is similar to the electrographic writing head circuit of FIG. 2. They differ in that a low voltage transistor 92 is used in the ion projection inverter circuit and a much lower potential difference is applied across the two reference potential buses. We have found that this type of circuit when used in an ion projection writing application results in major performance improvements over our writing head configuration disclosed in U.S. Pat. No. 4,584,592.

Ion projection printing requires modulation voltages on the order of about 15 to 50 volts to be applied to the modulation electrodes. In our '592 patent writing head configuration, the 15 to 20 volts must be transferred from a data line, through the low voltage pass transistor and onto the modulation electrode. This transfer must be achieved in a small fraction of the line writing time in order that all the next subsequent groups of electrodes in the line may be addressed. For example, at a process speed of 2 inch/sec and a resolution of 300 spots/inch, with 40 groups of 64 elements in each group, the full modulating voltage must be applied to the modulation electrodes in each group in about 30–40 μsec. After that time, the pass transistor is turned OFF and there may be no further data loading and no further way to modify the "floating" charge on the writing element. Furthermore, the full data line voltage cannot be transferred in that short period of time. Although the time is sufficient to charge or discharge the modulation electrodes for writing, it appears that the limit of the process speed will have been substantially reached with the '592 configuration.

On the other hand, in the present writing head configuration we transfer the data line voltage through the low voltage latching transistor 90 solely for changing the state of the inverter circuit low voltage transistor 92. The transferred data line voltage is applied to the gate of the inverter circuit transistor 92 in the same 30–40 μsec. Although there is no further way to modify the voltage on the gate, there is sufficient voltage to fully switch the inverter circuit transistor. Once switched, the writing element will be connected to one of two reference potentials, through buses 96 and 98, until the latching transistor is next switched. This allows us to apply a reference potential to the V+ bus 96, on the order of 20 to 50 volts, so that sufficient voltage will be transferred to the writing element, and to apply a reference potential to the V− bus 98, on the order of −5 to +5 volts, so that the writing element will be close to electrical ground.

It should be apparent that the major distinction betwen this writing head configuration and that of our '592 patent configuration is that the modulation electrodes herein are not electrically "floating" but are always connected to a source of reference potential. Thus, in the present embodiment, their charging time is not limited to the time allocated (i.e. 30–40 μsec) for loading data into a selected group of marking elements. The desired writing or non-writing potential has a substantially longer time to be applied, because once the inverter circuit transistor 92 has been latched into a particular state, the full potential on the modulation electrode achieves a steady state condition during the time dictated by an appropriate RC constant (i.e. the product of the load resistor and the modulation electrode capacitance; or the product of the ON resistance of the transistor 92 and the modulation electrode capacitance). As long as both RC constants are significantly less than (about 20–30%) one line time, one would not observe any degradation of print quality. For example, if we were to quadruple the print speed to 8 inch/sec, then the line time would be 400 μsec and we are able to design transistor 92 and load resistor 94 to achieve RC constants which are both less than 100 μsec.

Another significant advantage is achieved by this configuration. Capacitive coupling (crosstalk) between adjacent, closely spaced marking elements is reduced as compared to our ('592) patented configuration. In that configuration, since the elements are electrically "floating", each one affects the potential of its neighbors. This means that if two adjacent electrodes are to print one black and one white, the result may be that one is less black and the other less white, i.e., grayer copy. In our present invention, wherein the writing elements are always connected to the V+ or V− reference potential, the reference potential will force the marking elements back to their original potential after transient capacitive coupling between neighboring elements.

Resistive coupling effects which are also detrimental to our ('592) patented writing head, because the modulating electrodes are "floating", are significantly reduced in the present writing head configuration. If there is some surface conductivity on the glass substrate caused by, for example, moisture and chemical products formed thereby, or other contamination, a current leakage path will exist between marking elements. This again results in a grey output rather than crisp black and white. But in the present embodiment, as charge leaks from one marking element to another, the potential of the marking elements will not change significantly because they are always electrically connected to a reference potential. Thus, in the instances of both capacitive coupling and resistive coupling between the closely spaced modulation electrodes they always maintain or regain their correct potential through the inverter circuit.

A further advantage of the present configuration over that of our '592 patented configuration is that the present configuration makes it possible to use lower data line voltage levels, on the order of 15 volts, or less, which are consistent with conventional IC chips used in the data bus driver circuit. Heretofore, in the '592 configuration, it was necessary to use higher voltage, on the order of 20 volts, custom IC chips in order to deliver the desired voltage level to the modulation electrodes.

It should be understood that the present disclosure has been made only by way of example and that numerous changes in details of construction and the combination and arrangement of parts may be resorted to without departing from the true spirit and the scope of the invention as hereinafter claimed.

What is claimed:

1. An ionographic marking apparatus including a housing, means for generating a supply of marking ions within said housing, means for transporting said marking ions through and out of said housing, and means for controlling the transport of said ions out of said housing, said means for controlling comprising an integral marking head including a substrate upon which are integrally formed as thin film elements:

an array of closely spaced charge storage elements, each element switchable between a charge storage state for inhibiting transport of said ions out of said housing so as to prevent marking and an absence of charge state for allowing transport of said ions out of said housing so as to cause marking, first bus means connectable to a first reference potential and to said array of charge storage elements for transferring to said array of charge storage elements a voltage sufficient to cause said charge storage elements to achieve one of said two states, second bus means connectable to a second reference potential and to said array of charge storage elements for transferring to said array of charge storage elements a voltage sufficient to cause said charge storage elements to achieve the other of said two states, inverter circuit means connected between said first and second bus means, said inverter circuit means comprising a voltage divider having a load resistor in one leg and a transistor in the other leg and each of said marking elements is connected to the node of said voltage divider, latching means comprising a pass transistor connected to said inverter circuit means for changing the state of said inverter circuit, and information loading means, comprising a multiplexed array of data lines and address lines, connected to said latching means for selectively changing the state of said latching means.

2. The ionographic marking apparatus as defined in claim 1 wherein said first bus means is connected to a first reference potential in the range of 20–50 volts and said second bus means is connected to a second reference potential in the range of −5 to +5 volt.

* * * * *